United States Patent [19]
Mills

[11] 3,957,024
[45] May 18, 1976

[54] DEVICE FOR VAPORIZING LIQUID FUEL

[75] Inventor: Walter D. Mills, Mold, Wales

[73] Assignee: Shell Oil Company, Houston, Tex.

[22] Filed: Sept. 11, 1974

[21] Appl. No.: 505,197

[30] Foreign Application Priority Data
Sept. 11, 1973 United Kingdom............... 42635/73

[52] U.S. Cl. .............................. 123/122 E; 165/105; 123/122 A
[51] Int. Cl.² ........................................ F02M 31/00
[58] Field of Search... 123/122 E, 122 AB, 122 AA, 123/122 A; 165/105

[56] References Cited
UNITED STATES PATENTS

| | | | |
|---|---|---|---|
| 1,846,955 | 2/1932 | Dow | 165/105 |
| 3,217,792 | 11/1965 | Montabone | 165/105 |
| 3,682,237 | 8/1972 | Islo | 165/105 |
| 3,749,158 | 7/1973 | Szabo | 165/105 |
| 3,763,838 | 10/1973 | Lindsay | 123/122 AA |

*Primary Examiner*—Charles J. Myhre
*Assistant Examiner*—R. H. Lazarus
*Attorney, Agent, or Firm*—Ronald R. Reper

[57] ABSTRACT

A liquid containing heat pipe for vaporizing uncombusted fuel is disclosed having a liquid transfer storage zone and optionally separate heating means disposed to heat only part of the liquid in said pipe.

10 Claims, 3 Drawing Figures

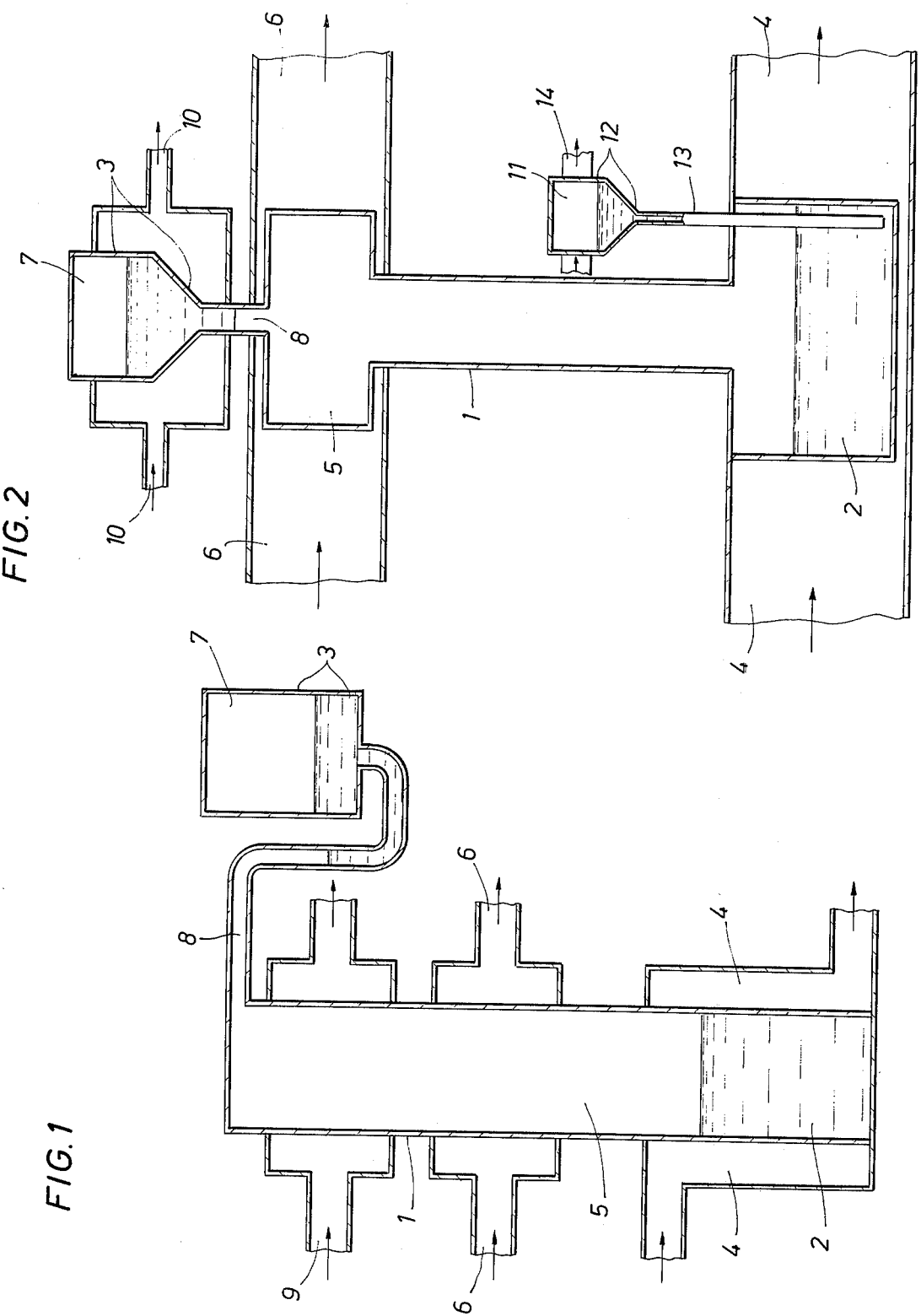

DEVICE FOR VAPORIZING LIQUID FUEL

BACKGROUND OF THE INVENTION

The invention relates to a device for vaporizing liquid fuel prior to its introduction into the combustion chambers of an internal combustion engine or a gas turbine, to an internal combustion engine or a gas turbine which contains such a device and to automotive vehicles which contain such an engine or gas turbine.

The conventional spark-ignition gasoline engine relies on a carburetor to mix a desired proportion of a volatile fuel with the inlet air. For complete combustion of the fuel-air mixture the fuel needs to be uniformly dispersed in the air. Such a uniform mixture is seldom if ever obtained in practice with a conventional carburetor, and manifold fuel injection offers only marginal improvement. In the conventional gas turbine a uniform fuel-air mixture is equally hard to achieve.

It has been proposed to vaporize the fuel prior to its introduction into a combustion chamber and prior to or after mixing it with the main stream of combustion air, with heat derived from the exhaust system, this heat being transported with the aid of a heat transfer fluid present in one or more so-called heat pipes, each of which is in the form of a substantially sealed vessel containing a heat transfer fluid having a boiling point at atmospheric pressure up to 400°C and so constructed that in operation the heat transfer fluid in the said heat pipe or heat pipes is evaporated in the so-called heat receiving zone of the heat pipe by heat received from the exhaust gases of the said engine, and condensation of the said evaporated heat transfer fluid taking place by discharging heat for the evaporation of fuel to be combusted in the so-called fuel vaporizing zone of the heat pipe.

The use of vaporized fuel enables a gasoline engine to be run on such lean mixtures, even in excess of 20:1 air-fuel ratio, that the levels of carbon monoxide and oxides of nitrogen are simultaneously low, thereby contributing to the abatement of environmental pollution.

The amount of heat transfer fluid that should be present in the heat pipe is related to the amount of fuel to be evaporated during running of the engine and it must in all cases even at high load and high speed, be sufficient to be able to transport the required amount of heat to evaporate the fuel from the heat receiving zone of the heat pipe to the fuel vaporizing zone of the heat pipe.

At cold start no hot exhaust gases are available and consequently no heat can be obtained therefrom for evaporation of the fuel. It has been proposed to use additional heating means at the start which heat and evaporate heat transport fluid in the heat pipe and thus provide heat which can be discharged to the fuel for the evaporation thereof. The additional heating means may e.g., consist of an electrical heating coil or a self-blowing gasoline blow lamp.

It is felt as a drawback that the total amount of heat transport fluid present in the heat pipe is to be heated to or nearly to its boiling temperature at cold start with the additional heating means discussed because this heating is evergy-consuming, and in particular time-consuming.

The time between the moment one wants to start driving an automotive vehicle and the moment the fuel can be evaporated is of importance, because evaporation of the fuel ensures running of the engine without the formation of undesirable amounts of noxious compounds such as carbon monoxide and nitrogen oxides in the exhaust gases, as described above.

There has now been found a device which makes evaporation of the amount of fuel required at cold start less time- and less energy-consuming.

SUMMARY OF THE INVENTION

The present invention provides a device for vaporizing liquid fuel prior to its introduction into the combustion chamber of an internal combustion engine or a gas turbine which comprises a heat pipe which is in the form of a sealed vessel containing a heat transfer fluid comprising a vaporizable liquid having a boiling point at atmospheric pressure up to 400°C and a non-condensable gas, which heat pipe comprises:

a. a heat-receiving zone operatively engaging the exhaust system of said engine or gas turbine, for heating the heat transfer fluid and vaporizing said liquid with the heat from said exhaust system, b. a heat-discharging zone operatively engaging the fuel inlet system of said engine or gas turbine for cooling and condensing the heat transfer liquid by transference of heat to said fuel to be evaporated, said heat discharging zone communicating with said heat receiving zone whereby condensed heat transfer liquid is directly returned to said heat receiving zone, and c. a heat transfer liquid storage zone in communication with the heat receiving zone or the heat discharge zone for storage of at least a portion of the heat transfer liquid.

In a preferred embodiment the heat pipe device has in addition separate heating means operatively engaged within the heat receiving zone and disposed so that only part of the liquid present in the heat pipe can be heated with said separate heating means in a start-heat-receiving-zone.

BRIEF DESCRIPTION OF THE DRAWINGS

FIG. 1 of the drawings is a schematic diagram of one embodiment of a heat pipe device employing the improvement of the present invention.

FIG. 2 of the drawings is a schematic diagram of another embodiment of the invention.

DETAILED DESCRIPTION OF THE INVENTION

Figure 3:
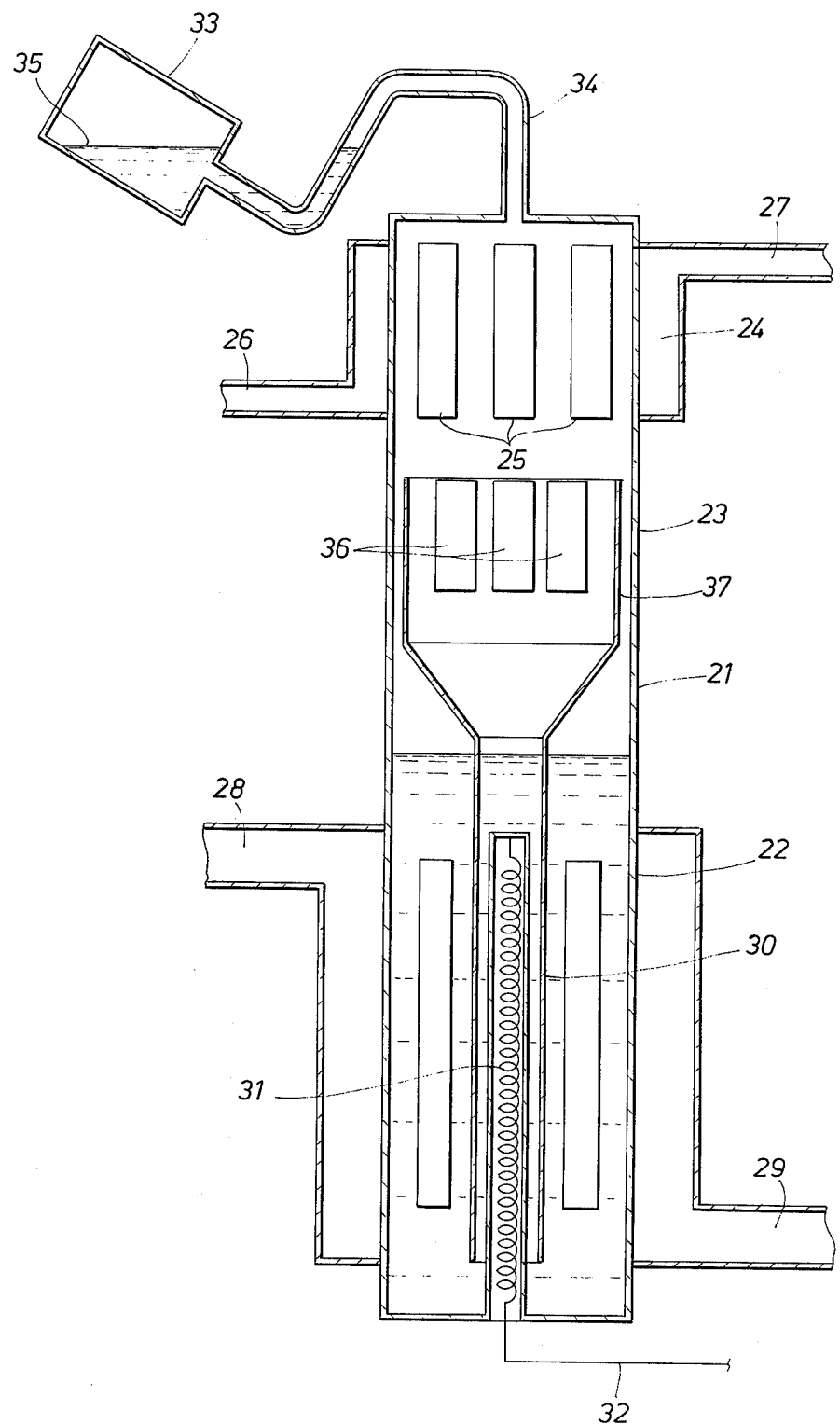
FIG. 3 of the drawings is a schematic diagram of still another embodiment of the invention.

The geometry of the heat pipe is in no way limited to circular or tubular configurations.

The start-heat-receiving zone may consist of e.g., a container closed at the bottom which contains heat transfer liquid that is heated with the separate heating means during start up, and is kept in the said container during running of the engine at normal conditions, viz. when the heat of the exhaust gases is used to evaporate the fuel. The heat transfer fluid in the said container is not used during running at normal conditions, and consequently the heat pipe contains more heat transfer fluid than is absolutely necessary. For that reason heat pipes are preferred which are so constructed that the heat transfer fluid present in the start-heat-receiving zone will also take part in the heat transport during running when the heat pipe has reached running temperature, or in other words will be taken up in the bulk of the heat transfer liquid when the heat pipe has reached running temperature.

Very suitably the heat pipe which contains separate heating means is constructed as a multitubular boiler of which at least part of the tubes are not completely horizontal, at least one but not all of the said tubes being provided with separate heating means. It is preferred that the said tubes are in a substantially vertical position.

Very conveniently the heat transfer liquid in the start-heat-receiving zone is, at least partly, thermally insulated from other liquid present in the heat pipe. In this way loss of heat from the separate heating means is prevented, and consequently the heating up of the heat transfer present in the start-heat-receiving zone is accelerated.

The separate heating means may consist of any suitable type of apparatus, such as a self-blowing gasoline blow lamp. It is preferred that the separate heating means consist of an electrical heating coil, which conveniently obtains its energy from an electrical battery, e.g., the battery of an automotive vehicle.

The heat transfer fluid present in the heat pipe should preferably have a boiling point at atmospheric pressure of up to 400°C. Heat transfer fluids with a higher boiling point at the pressure operating in the heat pipe may give rise to cracking of the fuel, while in most cases heat transfer fluids with very low boiling points are not able to vaporize all the fuel.

The choice of the heat transfer fluid will depend on the general characteristics of the fuel to be employed and in particular the final boiling point of the latter. The liquid component of the heat transfer fluid may be a pure substance of mixture such that the freezing temperature lies between 0°C and −100°C. It is to be chemically stable and non-corrosive to the materials of construction used at the operating temperature of the heat pipe and appreciable chemical decomposition or reaction should not occur within a period of several years when within the heat pipe. Examples of suitable heat transfer fluids are 2-octanol, decane, tetralin, and in particular fluids which consist for at least 50%w of water.

In case water-comprising fluids are used they preferably contain a suitable stable anti-freeze material, in order to obtain an acceptable freezing point. Alcohols are very suitable as anti-freeze material, and accordingly very suitable heat transfer fluids substantially consist of a mixture of water and ethylene glycol, or more preferably of a mixture of water and methanol and/or ethanol. It will be understood that other compounds, such as anti-corrosion additives and anti-oxidants may be present in the heat transfer fluid in minor amounts.

As the heat demand from the heat pipe may vary considerably surplus heat may either be removed by additional cooling means or by regulation of the heat intake. Additional cooling means may e.g., consist of a honeycomb or a multitubular condenser in the upper part of the heat pipe which are cooled, for example with the aid of the cooling system of the engine. In case additional cooling means are used very suitably a separate return line for heat transfer fluid condensed by these means to the liquid bulk of that fluid in the heat pipe, without contacting this condensed heat transfer fluid with the fuel vaporizing section or the rising vapor of the heat transfer fluid is applied. It is also possible to cool the upper part of the heat pipe itself by connecting it to the cooling system of the engine. Air may also be used as additional cooling agent.

In the heat transfer fluid the inclusion of a non-condensable gas in the heat pipe is a convenient means for preventing overheating of the heat transfer fluid. In operation, the non-condensable gas will be driven to a relatively cool part of the vessel by the motion of the heat transfer fluid and progressively compressed as the temperature in the heat pipe rises in excess of requirements. The loss of heat from the vapor rising in the heat pipe at the level of the additional cooling means, that are preferably present, will determine the loss of surplus heat and thus prevent overheating.

The non-condensable gas should be gaseous at the operating pressure and chemically non-reactive within the heat pipe. Examples are nitrogen, helium, argon, neon and krypton.

The heat pipe contains a heat transfer liquid storage zone or container in communication with the heat receiving zone or the heat discharge zone storage zone of the heat pipe and which can be cooled separately, e.g., with air or with the aid of the cooling system of the engine or gas turbine. This storage zone is preferably constructed in such a way that liquid and gas can be stored therein, with the liquid separating the said gas from the contents of the heat pipe. The liquid can be transported to the heat pipe by gas pressure from the gas which is separated from the contents of the heat pipe. Such a container is in particular very valuable in case the heat transfer fluid comprises two compounds with different boiling points, e.g., water and methanol.

During start up no large amount of heat is required to vaporize the fuel and the lower boiling point liquid that evaporates in the start-heat-receiving zone is able to furnish a sufficient amount of heat to the heat discharging zone of the heat pipe. When the heat pipe reaches running temperature and more heat is to be transported by the heat transfer fluid in order to vaporize all fuel, the lower boiling compound is partly or totally distilled from the heat pipe to the said container and condensed therein. When the engine is stopped the pressure in the heat pipe drops because vapor in the heat pipe condenses, and the liquid present in the container is returned to the bulk of the heat transfer liquid in the heat pipe by pressure exerted by the gas, which in general will be a non-condensable gas, which is present in the container and which is separated from the contents of the heat pipe by the liquid stored in the container.

Since in the start-heat-receiving zone only part of the heat transfer liquid present in the heat pipe is heated, its vaporization will readily take place and accordingly heat will be readily supplied to the heat discharging zone, and therefore the fuel will be vaporized a short time after the heating means in the start-heat-receiving zone have been ignited.

The vapor of the heat transfer fluid which will have discharged its heat to the fuel to be vaporized in the heat discharging zone of the heat pipe will condense and flow back into the heat pipe. It is of advantage that the start-heat-receiving zone is so arranged that liquid emerging from the heat discharging zone flows to the start-heat-receiving zone.

This condensed heat-transfer fluid in general has a higher temperature than the bulk of the heat transfer fluid in the heat pipe at cold start, and accordingly its re-evaporation in the start-heat-receiving zone will require less energy and less than that of the same amount of the bulk of the heat transfer fluid.

The amount of heat transfer fluid which is to be heated with the aid of the separate heating means and which is to be present in the start-heat-receiving zone may vary between wide limits. In most cases amounts of from one-half to one-tenth of the total amount of heat transfer fluid present in the heat pipe will be very suitable.

After the engine or gas turbine has run for some time the exhaust gases will be available in such a quantity and will have reached such a temperature, that they are able to supply sufficient heat to the heat pipe for bringing it at its running temperature, which means that the bulk of the heat transfer liquid in the heat pipe can evaporate at such a rate that sufficient heat can be transported therewith for the evaporation of the fuel. At that time the separate heating means may be extinguished.

It is preferred that the separate heating means are automatically ignited from the ignition switch of the engine, and automatically extinguished when the heat pipe heated by the exhaust gases reaches running temperature.

The invention also relates to an internal combustion engine (in particular a spark ignition engine) or a gas turbine which contains a device according to the invention. The device forms part of the inlet system and is arranged therein in such a way that during running when the heat transfer fluid in the heat pipe is at its running temperature, the heat receiving zone of the heat pipe receives heat from the exhaust system of the engine, and the heat discharging zone of the heat pipe discharges heat to the fuel which is present in the fuel supply system of the engine. The heat discharging zone of the heat pipe may be in contact with a section of the fuel supply system where the fuel has not yet been mixed with the combustion air, or with a section of it where the fuel has been mixed with part or all of the combustion air.

As mentioned above the heat supply to the heat pipe may also be controlled by means which regulate the amount of the exhaust gases which is contacted with the heat receiving zone of the heat pipe. This may be achieved by by-passing part of the exhaust gases, which may be accomplished with the aid of e.g., a diverter valve in the exhaust system, which very suitably is controlled automatically dependent on, for example, the pressure in the heat pipe, or the position of the throttle in the inlet system or the temperature of the exhaust gas.

In order to keep the amount of noxious compounds in the exhaust gases, which mainly consist of CO, nitrogen oxides ($NO_x$) and hydrocarbons, as low as possible, it is of advantage as discussed above, to run the engine on lean mixtures, or in other words to use an amount of air in excess of the amount needed for the total combustion of the fuel to $CO_2$ and $H_2O$. By doing so less power is obtained from the engine as compared when running it with optimum amounts of fuel and air. To increase the power output the inlet system very suitably contains a compressor (also called supercharger). This compressor may be present in the system downstream of the point where part or all of the combustion air and the fuel have been mixed, but it is preferred that the supercharger compresses the main air stream before it is mixed with the fuel.

In order to keep the heat pipes as short as possible, it is convenient to locate the part of the inlet system where the fuel and the air are mixed and the part of the inlet system where the fuel is vaporized with the aid of the heat pipe, at the exhaust side of the engine, preferably substantially above the exhaust system. The heated mixture of vaporized fuel and air is very conveniently passed from there across the engine (e.g., over or alongside the engine) to the point where it is distributed amongst the cylinders of the engine.

It is of advantage, in order to avoid misfiring with the weak fuel-air mixtures that are preferably used, that near the inlet of each cylinder an adjustable valve for bleeding in air is present as described in British patent application no. 18751/73. If desired, water or steam may be injected into the cylinders.

It may be understood that more than one heat pipe may be used in an inlet system for transporting the heat of the exhaust system to the heat discharging zone of the heat pipe. Preferably at least one of the heat pipes should contain separate heating means according to the invention.

The invention will now be further illustrated by way of example with reference to the accompanying drawings which show in a diagrammatical form apparatus according to the invention.

In FIG. 1 a heat pipe closed vessel 1 contains a heat transfer fluid, which is in the liquid phase (hatched) in the heat-receiving zone 2 and in the heat transfer liquid storage zone 3. The heat-receiving zone 2 is heated by hot gas from the exhaust of a combustion engine or turbine via conduit 4. Owing to this heat supply liquid present in the heat-receiving zone is evaporated and heat transfer fluid in the gaseous phase is forwarded to the heat-discharging zone 5. A mixture of air and fuel to be heated in the heat-discharging zone is supplied via conduit 6. Part of the heat transfer fluid is condensed in the heat-discharging zone and flows back (e.g., by gravitational force or by means of a wick) to the heat-receiving zone 2. In case not all of the heat transfer fluid in the heat-discharging zone 5 is condensed, part of the remaining gas condenses in the heat transfer liquid storage zone 3. Equilibrium will be reached when the amount of heat transfer fluid evaporated in the heat-receiving zone 2 will be substantially equal to the amount of heat transfer fluid condensed in the heat-discharging zone 5. The non-condensable gas present in the system will for the greater part by replaced by the vapor of the heat transfer fluid, and will accumulate in that part of the heat transfer liquid storge zone 7 that is above the heat transfer fluid in the liquid hase in that zone. In case the amount of heat discharged in the heat-discharging zone 5 decreases, the amount of non-condensed heat transfer fluid from this zone increases, and will be transported to and condensed in the heat transfer liquid storage zone 3. In case the amount of heat discharged in the heat-discharging zone 5 increases, the amount of heat transfer fluid condensed will increase, and as the amount of heat transfer fluid in the gaseous phase will accordingly decrease, pressure will drop. Due to the pressure of the non-condensable gas 7 in the heat transfer liquid storage zone 3 heat transfer fluid in the liquid phase will be transported via conduit 8 which may be a capillary and via the heat-discharging zone 5 to the heat-receiving zone 2. In the latter zone the surface between the heating means 4 and the heat transfer liquid will increase because the amount of heat transfer liquid increases, and accordingly more heat transfer liquid will evaporate per time unit and be forwarded in the gaseous phase to the heat-discharging zone 5, thus supplying an increased amount of heat to be discharged. In a short time a new equilibrium will be reached.

Similarly in case the heat supply to the heat-receiving zone decreases, and accordingly, the amount of heat transfer liquid evaporated in that zone decreases, heat transfer fluid in the liquid state will be transported from the heat transfer liquid storage zone to the heat-receiving zone.

In the apparatus additional cooling means 9 may be present between the heat-discharging zone 5 and the heat transfer liquid storage zone 3, but this is by no means necessary.

In FIG. II (in which the numerals have the same meaning as in FIG I) an embodiment of the invention is given in which two heat transfer liquid storage zones are present, viz. 3 and 12. Heat transfer fluid is forwarded in the liquid form from the heat-receiving zone 2 via conduit 13 to the heat transfer liquid storage zone 12, in which a non-condensable gas 11 is present. Additional cooling means 14 are present for the heat transfer liquid storage zone 12. It will be clear that embodiments which contain only one heat transfer liquid storage zone 12 which is connected with the heat-receiving zone 2 with a conduit 13 (and in which the heat transfer liquid storage zone 3 and conduit 8 are not present) are also feasible.

Another embodiment of the invention is depicted in FIG. III.

This device comprises a heat pipe 21 in the form of a vessel having a lower heat-receiving section 22 in the form of a tubular boiler, a heat-discharging zone 23, and a space 24 containing additional cooling means in the form of a multitubular condenser 25, which is cooled by liquid from the cooling system of the engine, which liquid is entering via 26 and discharged via 27. The additional cooling means is optional.

Exhaust gases enter the heat-receiving section of the heat pipe via 28 and are removed via 29. The central tube 30 of the tubular boiler contains an electrical heating coil 31, which is fed via 32 from a battery (not shown).

Heat transfer liquid storage zone 33 is attached to the top of the heat pipe via conduit 34. Line 35 indicates the level of liquid which e.g., may be present in the container when the heat pipe is at running temperature, and the heat transfer fluid is heated by the exhaust gases while the vehicle is at a certain speed. At cold start the electrical heating coil 31 heats the heat transfer liquid in the central tube 30, which evaporates, and the heat transfer vapor is condensed in the heat-discharging zone of the heat pipe where its heat is discharged to the fuel which is transported through the fuel supply lines 36. The heat transfer liquid condensed in the heat-discharging zone is led back to the central tube 30 via a funnel-shaped conduit 37. When the heat pipe is at running temperature and the heat transfer fluid is evaporated by heat of the exhaust gases, the vapor of the heat transfer fluid enters the heat-discharging zone from the upper side.

What is claimed is:

1. In the combination (1) a combustion chamber-containing apparatus selected from the group consisting of an internal combustion engine and a gas turbine, and (2) a device for vaporizing liquid fuel prior to its introduction into the combustion chamber of said apparatus which device comprises a heat pipe which is in the form of a sealed vessel containing heat transfer fluid comprising a vaporizable liquid having a boiling point at atmospheric pressure up to 400°C and a non-condensable gas, which heat pipe comprises:
    a. a heat-receiving zone operatively engaging the exhaust system of said apparatus, for heating the heat transfer fluid and vaporizing said liquid with the heat from said exhaust system,
    b. a heat-discharging zone operatively engaging the fuel inlet system of said apparatus for cooling and condensing the heat transfer liquid by transference of heat to said fuel to be evaporated, said heat discharging zone communicating with said heat receiving zone whereby condensed heat transfer liquid is directly returned to said heat receiving zone,
    c. the improvement comprising at least one heat transfer liquid storage zone in communication with the heat receiving zone or the heat discharge zone for storage of at least a portion of the heat transfer liquid and non-condensable gas and constructed such that the stored liquid separates the stored gas from the contents of the remainder of the heat pipe.

2. A device according to claim 1, having in addition cooling means operatively engaging the heat transfer liquid storage zone for cooling said storage zone.

3. A device according to claim 2, in which said cooling means can be operatively cooled with combustion air.

4. The combination according to claim 1, the improvement further comprising having in addition separate heating means operatively engaged within said heat receiving zone and disposed so that only part of the liquid present in the heat pipe can be heated with the said separate heating means in a start-heat-receiving zone.

5. The combination according to claim 4, in which the heat-receiving zone is disposed to flow liquid emerging from the heat-discharging zone to the start-heat-receiving zone.

6. The combination according to claim 4, in which the amount of heat transfer fluid in the start-heat-receiving zone at cold start is from one-half to one-tenth of the total amount of heat transfer fluid present in the heat pipe.

7. The combination according to claim 4, in which the start-heat-receiving zone is, at least partly, thermally insulated from the remainder of the heat pipe.

8. The combination according to claim 4, in which the separate heating means consist of an electrical heating coil.

9. The combination according to claim 1, in which in the device the heat transfer fluid consists of at least 50%w water.

10. The combination according to claim 9, in which the heat transfer fluid contains an alcohol.

* * * * *